US011982022B2

(12) United States Patent
Devaraj

(10) Patent No.: US 11,982,022 B2
(45) Date of Patent: May 14, 2024

(54) SYSTEM FOR MANUFACTURING TEXTILE PRODUCTS FROM ROVING WASTE MATERIAL AND METHOD THEREOF

(71) Applicant: SHARADHA TERRY PRODUCTS LTD, Coimbatore (IN)

(72) Inventor: Vikram Krishna Devaraj, Coimbatore (IN)

( * ) Notice: Subject to any disclaimer, the term of this patent is extended or adjusted under 35 U.S.C. 154(b) by 681 days.

(21) Appl. No.: 17/250,414

(22) PCT Filed: Jan. 24, 2020

(86) PCT No.: PCT/IN2020/050078
§ 371 (c)(1),
(2) Date: Jan. 19, 2021

(87) PCT Pub. No.: WO2020/152717
PCT Pub. Date: Jul. 30, 2020

(65) Prior Publication Data
US 2021/0262124 A1    Aug. 26, 2021

(30) Foreign Application Priority Data

Jan. 27, 2019  (IN) .............................. 201841049365

(51) Int. Cl.
*D02G 3/02* (2006.01)
(52) U.S. Cl.
CPC ...................................... *D02G 3/02* (2013.01)
(58) Field of Classification Search
CPC ............ D02G 3/02; D02G 3/36; D01G 11/00
See application file for complete search history.

(56) References Cited

U.S. PATENT DOCUMENTS 3,107,412 A * 10/1963 Hall ........................ D01G 1/10
                                                                19/0.56
3,987,615 A * 10/1976 Hill, Jr. ................... D01B 1/00
                                                                19/65 R
(Continued)

FOREIGN PATENT DOCUMENTS

CN         107761209 A       3/2018
EP           3725923 A1 *   10/2020     ............... D02G 3/02

OTHER PUBLICATIONS

Ali Akbar Merati et.al., "A Unique Method of Producing Two-Component Yarns in Friction Spinning", Research Journal of Textile and Apparel (RJTA), vol. 9, No. 2, 2005, pp. 9-15.
(Continued)

*Primary Examiner* — Tajash D Patel
(74) *Attorney, Agent, or Firm* — INNOVATION CAPITAL LAW GROUP, LLP; Vic Lin

(57) ABSTRACT

The present invention relates to textile products and the manufacture of yarns. More particularly, the present invention relates to a system for manufacturing textile products from roving waste material. Further, the present invention relates to the method of manufacturing 100% regenerated ring spun yarn, out of waste generated during spinning and additionally, the present invention relates to the method of manufacturing regenerated ring spun yarn with cotton waste, comber noil and carding flat waste which produces 100% cotton ring spun yarn. Advantageously the present invention relates to a cost effective method for recycling roving waste generated during cotton spinning, and produces yarns of the highest possible quality when compared with the virgin fibers.

6 Claims, 1 Drawing Sheet

(56) References Cited

U.S. PATENT DOCUMENTS

| | | |
|---|---|---|
| 5,331,801 A | 7/1994 | Heifetz |
| 9,885,127 B2 | 2/2018 | Lightman |
| 2009/0173054 A1 | 7/2009 | Silver |
| 2009/0173055 A1* | 7/2009 | Silver ............... D02G 3/04 57/400 |
| 2011/0250425 A1 | 10/2011 | Lightman |
| 2013/0101781 A1 | 4/2013 | Lee et al. |
| 2016/0002829 A1 | 1/2016 | Lightman |

OTHER PUBLICATIONS

International Search Report & Written Opinion dated May 8, 2020 from PCT Application No. PCT/IN2020/050078.

\* cited by examiner

SYSTEM FOR MANUFACTURING TEXTILE PRODUCTS FROM ROVING WASTE MATERIAL AND METHOD THEREOF

FIELD OF INVENTION

The present invention relates to textile products and the manufacture of yarns. More particularly, the present invention relates to a system for manufacturing textile products from roving waste material. Further, the present invention relates to the method of manufacturing 100% regenerated ring spun yarn, out of waste generated during spinning and additionally, the present invention relates to the method of manufacturing recycled ring spun yarn with cotton waste, comber noil and carding flat waste which produces 100% cotton ring spun yarn.

DESCRIPTION OF PRIOR ART

In the cotton textile industry, using the current processes of producing finished apparel and related goods from raw virgin cotton, 20-49% of the original fibre and in the raw material is typically lost as waste in the various processes. Once produced the finished goods have a limited life; after they have ended their useful life they are possibly used as rags for a brief period and then typically discarded to end-up in a landfill or waste incineration facility.

Up to 40% of cotton grown is wasted between the harvest and the manufacturing of garments and textiles. Most of this waste ends up either directly into landfills or is incinerated. By recycling cotton waste, not only can landfill space be conserved, but the amount of land, water, energy, pesticides, and human labor that goes into cotton production can be reduced.

US20110250425A1 relates to "Processes for Using Recycled Waste Cotton Material in Producing a Textile Product and Textile Products Produced from Waste Cotton Material". A process for using recycled waste cotton material to produce a textile product is provided. The process can include waste collected from different processes and categories of waste cotton material from a variety of textile formation processes. The process can also include selecting specific categories of waste cotton material to be blended together depending on the textile product to be produced. In the process, sequence of cleaning, opening and blending processing steps can be selected to be used in making a yarn depending on the textile product to be produced. The selected specific categories of waste cotton material can be cleaned, opened and blended into blended cotton fibers. The blended cotton fibers can then be processed into the textile product to be produced. Thus, a textile product can be provided that includes yarn that can have at least three different categories of waste cotton material that are from textile formation processes. However the yarn manufacturing process requires maintaining a higher level of Twist Multiplier than that used for Regular cotton yarn. This adversely affects the yarn spinning production and end product performance example softness and water absorbency. The yarn hairiness also is much higher as compared to the yarn from virgin cotton.

U.S. Pat. No. 5,331,801A relates to "Recycled yarns from textile waste and the manufacturing process thereof". The subject of the invention provides a new method for manufacturing yarns using recycled cotton waste and a new type of recycled cotton yarn. Various types of cotton waste materials such as manufacturing by-products and post-consumer material are used in conjunction with virgin yarns to produce recycled yarns of sufficient quality to be used for garment manufacture. However our invention relates to manufacturing of yarn from 100% pre consumer waste derived after the roving process, popularly known as roving waste, without blending with virgin cotton. Post consumer waste fiber generally is made up of very short fibers and results in very low CSP of the formed yarn, roving waste on the other hand have relatively higher fiber length distribution and hence there is no compromise in terms of strength in the resulting yarn US20090173054A1 relates to a composite cotton and hemp yarn and method for making the same. A composite hemp and cotton yarn is formed by blending hemp fibers with cotton fibers which have been regenerated from waste cotton material such as trimmings and cuttings from the apparel manufacturing industry. The fibers are cleaned and blended, then carded to align the fibers into strands. Depending on the size and texture of the desired yarn, the fibers are stretched and drawn into slivers prior to spinning to join the fibers together. The hemp fibers are up to three times longer than the regenerated cotton fibers, so that the hemp fibers overlap and braid onto the regenerated cotton fibers during spinning. The resultant yarn is stronger and more absorbent than yarns made solely out of regenerated cotton fibers or a blend of cotton and acrylic or cotton and polyester fibers. However they used different categories of waste cotton material from a variety of textile formation process.

U.S. Pat. No. 9,885,127B2 relates to processes for using recycled waste cotton material in producing a textile product and textile products produced from waste cotton material. A process for using recycled waste cotton material to produce a textile product is provided. The process can include collecting different categories of waste cotton material from a variety of textile formation processes. The process can also include selecting specific categories of waste cotton material to be blended together depending on the textile product to be produced. In the process, sequence of cleaning, opening and blending processing steps can be selected to be used in making a yarn depending on the textile product to be produced. The selected specific categories of waste cotton material can be cleaned, opened and blended into blended cotton fibers. The blended cotton fibers can then be processed into the textile product to be produced. Thus, a textile product can be provided that includes yarn that can have at least three different categories of waste cotton material that are from textile formation processes. However they used different categories of waste cotton material from a variety of textile formation process.

CN107761209A relates to a kind of waste and old cotton goods regeneration antibacterial blended yarn and preparation method thereof and system. The present invention relates to a kind of waste and old cotton goods regeneration antibacterial blended yarn and preparation method thereof and system, described waste and old cotton goods regeneration antibacterial blended yarn, regenerated fiber first is made using waste and old cotton goods and dipping sizing agent, multiple efficacies component is included in described dipping sizing agent, from prepared by regenerated fiber in, above-mentioned various effect components are dispersed in the gap of fiber surface, and more preferable modification has been carried out to regenerated fiber; Regenerated fiber is first further subjected to shredding, removal of impurities, the regenerated fiber after removal of impurities and the bombax cotton after shredding, removal of impurities processing are sufficiently mixed again, afterwards successively through coiled, cotton carding, drafting, rove, spun yarn, spraying, winder processing, obtained waste and old cotton goods regeneration antibacterial blended yarn has good mechanical performance, anti-wear performance and stability, it is durable in use, natural environmental-protective is harmless to the human body, and with good mould proof, bacteriostasis property, the quality of regeneration cotton yarn is improved, has widened the use range of regeneration cotton yarn. However they used different categories of waste cotton material from a variety of textile formation process.

Consequently, there exists a need for a system for manufacturing textile products from roving waste material. Further, there exists a need for a method of manufacturing 100% regenerated ring spun yarn.

OBJECTS OF INVENTION

It is the primary object of the present invention to provide a 100% regenerated ring spun yarn from roving waste material.

It is another object of the present invention to provide a system and a method of manufacturing regenerated ring spun yarn.

It is another object of the present invention to provide a cost effective method for recycling roving waste generated during cotton spinning, and produces yarns of the highest possible quality when compared with the virgin fibers.

It is another object of the present invention, wherein the system uses only standard manufacturing equipment.

It is another object of the present invention, wherein the method for roving waste into yarn is performed by ring spinning process/open-end spinning.

It is a further object of the invention to produce premium fabrics with green ECO label using regenerated yarn produced from roving waste.

SUMMARY OF INVENTION

One or more of the problems of the conventional prior art may be overcome by various embodiments of the present invention.

It is the primary aspect of the present invention to provide a regenerated ring spun yarn, comprising:
  roving waste 60-100% by weight;
  comber noil 0-20% by weight; and
  carding flat waste 0-20% by weight,
    wherein the regenerated ring spun yarn comprises of 100% by weight of roving waste or a combination of roving waste with comber noil and carding flat waste.

It is another aspect of the present invention to provide a method for manufacturing regenerated ring spun yarn with roving waste material, comprising:
  collecting the roving waste from a roving frame and a ring frame;
  collecting the comber noil from a comber and the carding flat waste from a carding machine;
  opening the roving waste by using roving waste opener;
    wherein, mixing 60-100% by weight of roving waste with 0-20% by weight of comber noil and 0-20% by weight of carding waste material through the blowroom with 2-3 beating points with a flat speed in carding at 280 to 310 MPM;
  doubling and processing carded sliver with 60-100% by weight of roving waste, 0-20% by weight of comber noil and 0-20% by weight of carding waste material through the drawing frame;
  feeding the drafted sliver to the simplex roving frame by keeping the Twist Multiplier at 1.4 to 1.54;
  feeding the roving bobbin in to the ring frame to produce the yarn and wound it on the winding/auto winding machine; and
  regenerating yarn of 100% cotton/regenerated ring spun yarn made out of 60-100% by weight of roving waste with 0-20% by weight of comber noil and 0-20% by weight of carding waste material,
    wherein the 100% yarn is produced without any increase in twist multiplier compared to virgin material both in roving frame and ring spinning process, since roving waste comprises of minimum short fibers, and
    wherein the regenerated ring spun yarn comprises of 100% by weight of roving waste or a combination of roving waste with comber noil and carding flat waste.

It is another aspect of the present invention, wherein the sliver is spun into yarn of 100% cotton with sheath core effect or with a core made of manmade fiber and the sheath made of 100% Regenerated cotton roving fiber.

It is another aspect of the present invention, wherein the roving cotton waste materials are taken as source material in a process for making regenerated ring spun yarn.

It is another aspect of the present invention, wherein the roving waste is selected from Cotton fibers, Natural fibers or natural, Synthetic blend and the like.

It is another aspect of the present invention, wherein the method is implemented with a system comprising standard manufacturing equipments such as roving waste opener, blow room, carding machine, draw frame, roving frame, ring frame and winding/auto winding machine.

It is another aspect of the present invention, wherein premium fabrics such as bath towels, bath mats, bed Linen fabrics and the like with green ECO label using regenerated yarn produced from roving waste material.

BRIEF DESCRIPTION OF THE DRAWINGS

So that the manner in which the features, advantages and objects of the invention, as well as others which will become apparent, may be understood in more detail, more particular description of the invention briefly summarized above may be had by reference to the embodiment thereof which is illustrated in the appended drawings, which form a part of this specification. It is to be noted, however, that the drawings illustrate only a preferred embodiment of the invention and is therefore not to be considered limiting of the invention's scope as it may admit to other equally effective embodiments.

DETAILED DESCRIPTION OF THE INVENTION

Figure 1:
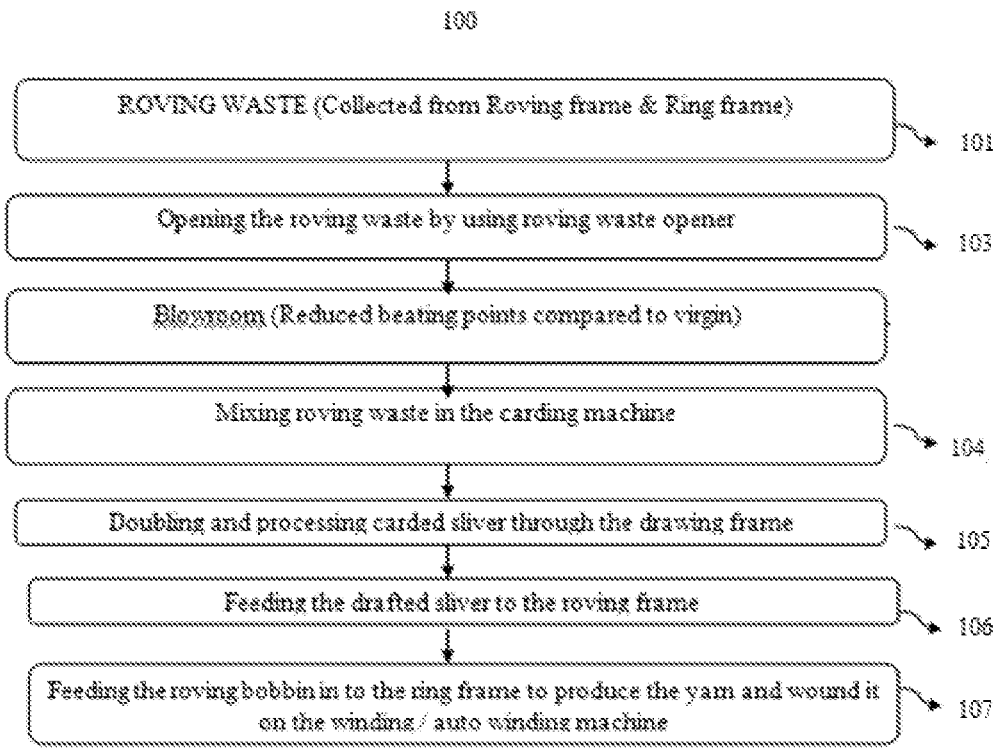
FIG. 1: illustrates the flowchart illustrating the method of manufacturing textile products from roving waste material according to one embodiment of the present invention.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The present invention relates to textile products and the manufacture of yarns. More particularly, the present invention relates to a system for manufacturing textile products from roving waste material. Further, the present invention relates to the method of manufacturing 100% regenerated ring spun yarn, out of waste generated during spinning and additionally, the present invention relates to the method of manufacturing regenerated ring spun yarn with roving waste, comber noil and carding flat waste which produces 100% cotton ring spun yarn.

A regenerated ring spun yarn, comprises roving waste 60-100% by weight, comber noil 0-20% by weight and carding flat waste 0-20% by weight. The regenerated ring spun yarn comprises of 100% by weight of roving waste or a combination of roving waste with comber noil and carding flat waste.

Figure 2:
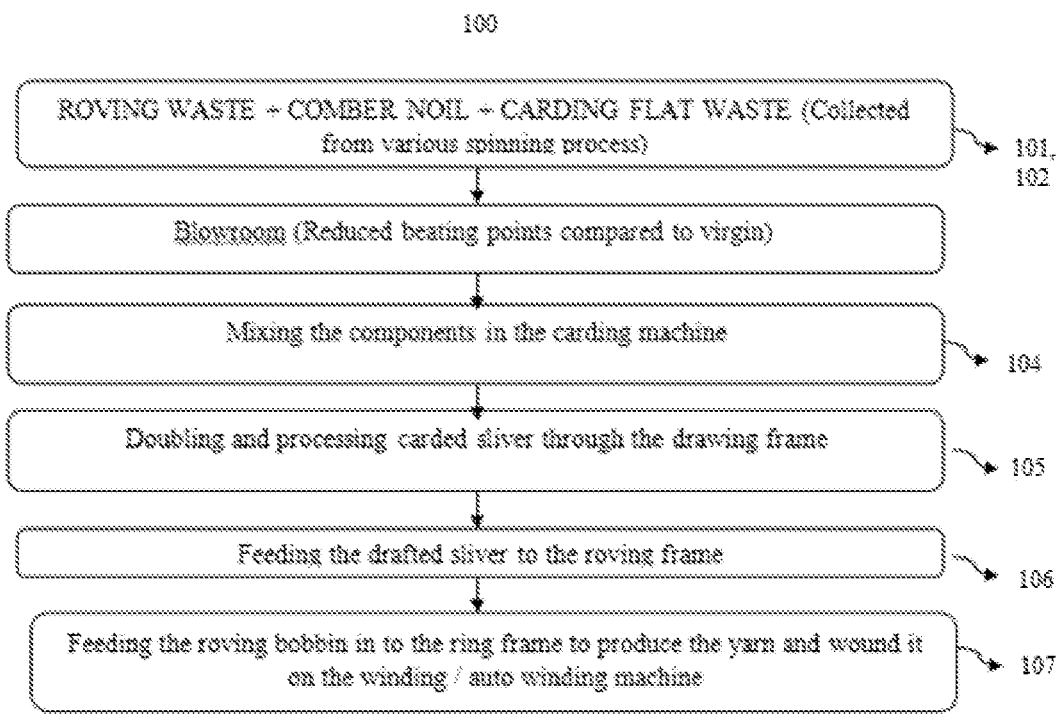
FIG. 2: illustrates the flowchart illustrating the method of manufacturing textile products from roving waste, comber noil & carding flat waste material and other according to one embodiment of the present invention.

Referring to FIG. 1, the flowchart illustrating the method of manufacturing textile products from 100% roving waste material according to one embodiment of the present invention is illustrated. Referring to FIG. 2, the flowchart illustrating the method of manufacturing textile products from roving waste, comber noil & carding flat waste material and other according to one embodiment of the present invention is illustrated. The method [100] for manufacturing regenerated ring spun yarn with roving waste material, comprises the following steps. The roving waste is collected [101] from a roving frame and a ring frame. The comber noil from a comber and the carding flat waste from a carding machine are collected [102]. The roving waste is opened [103] by using roving waste opener. 60-100% by weight of roving waste is mixed [104] with 0-20% by weight of comber noil and 0-20% by weight of carding waste material through the blow-room with 2-3 beating points with a flat speed in carding at 280 to 310 MPM. The doubling and drafting [105] the carded sliver with 60-100% by weight of roving waste, 0-20% by weight of comber noil and 0-20% by weight of carding waste material through the drawing frame is processed. The drafted sliver is feed [106] to the simplex roving frame for producing the roving bobbin with the Twist Multiplier of 1.4 to 1.54 and it is placed [107] in to the ring frame and then wound on winding/auto winding machine. The regeneration yarn of 100% cotton/regenerated ring spun yarn made out of 60-100% by weight of roving waste with 0-20% by weight of comber noil and 0-20% by weight of carding waste material is produced.

The 100% yarn is produced without any increase in twist multiplier compared to virgin material both in roving frame and ring spinning process, since roving waste comprises of minimum short fibers. The regenerated ring spun yarn comprises of 100% by weight of roving waste or a combination of roving waste with comber noil and carding flat waste. The sliver is spun into yarn of 100% cotton with sheath core effect or with a core made of manmade fiber and the sheath made of 100% Regenerated cotton roving fiber. The roving cotton waste materials are taken as source material in a process for making regenerated ring spun yarn.

Blow room is the very first process of yarn manufacturing. In blow room the raw cotton is fed as bale form and it converted as tuft by eliminating the trashes through beating. Initially the raw materials laid in the bale blucker zone. After that the material was taken to the first tuff opening machine, in which the first beating and cleaning is taken place. After that It will go to the homogeneous mixer for the better blending. Next to this the material went to the carding machine.

After this operation the tufts will be converted into the form of sliver in the next process named carding. In carding further cleaning will be done by carding the material. After the card process the silvers are doubled and drafted in the Draw frame which is the process will reduce the thickness and increase the strength of the sliver. (This activity is mainly to give the strength for the sliver to process it subsequently for the next roving stage.)

TABLE 1

Experimental Setting Comparison (Virgin Spinning Process and regenerated waste Spinning Process)

| | Virgin Spinning Process | Regenerated Waste Spinning Process |
|---|---|---|
| BLOW ROOM | | |
| VARIO CLEANER SPEED | 550 RPM | 200 RPM |
| GRID BAR SETTING | WIDE | CLOSE |
| UNIMAX BOOSTING FAN | 450 RPM | 220 RPM |
| UNIMAX BEATER SPEED | 550 RPM | BY PASS |
| FLEXI CLEANER SPEED | 550 RPM | BY PASS |
| FLEXI CLEANER BOOSTING FAN SPEED IN RPM | 450 RPM | 150 RPM |
| CARDING | | |
| CHUTE BEATER SPEED | 600 RPM | 600 RPM |
| PROD/HR | 120 | 120 |
| CLYINDER SPEED IN RPM | 510 | 510 |
| FLATS SPEED ON MPM | 310 | 310 |
| FLATS SETTING IN mm | 0.3, 0.3, 0.2, 0.2, 0.2, | 0.3, 0.3, 0.2, 0.2, 0.2, |
| FEED PLATE TO LICKER IN SETTING IN MM | 0.9 MM | 0.9 MM |
| WASTE PLATE SETTING | 0.9 MM | 0.9 MM |
| CYLINDER FRONT TOP PLATE SETTING | 0.7 MM | 0.7 MM |
| BREAKER DRAWING | | |
| SPEED | 325 MPM | 325 MPM |
| BREAK DRAFT | 1.5 | 1.5 |
| NO. OF. DOUBLING | 3 | 3 |
| FINISHER DRAWING | | |
| SPEED | 350 MPM | 350 MPM |
| BREAK DRAFT | 1.16 | 1.16 |
| SIMPLEX | | |
| HANK | 0.4 | 0.4 |
| SPEED | 1000 RPM | 1000 RPM |
| TM | 1.54 | 1.54 |
| RING FRAME | | |
| SPINDLE SPEED | 11000 RPM | 11000 RPM |
| TM | 3.5 | 3.5 |
| WINDING | | |
| SPEED | 1400 MPM | 1400 MPM |

TABLE 2

Categories of cotton waste fibers

| Roving Waste | Total |
|---|---|
| 100% | 100% |

TABLE 3

Categories of cotton waste fibers

| Combed Noil | Carding flat waste | Roving Waste | Total |
|---|---|---|---|
| 10% | 10% | 80% | 100% |
| 15% | 15% | 70% | 100% |

| Yard Type | Combed Noil | Combed Waste yarn | Ring Spinning Waste fibre | Ring Spun Waste Yarn | Carding waste | Opening waste | Roving Waste | Open End spinning waste fibre | Open end waste yarn | White or natural knitt cutting waste | Virgin Cotton | Polyester | Total |
|---|---|---|---|---|---|---|---|---|---|---|---|---|---|
| 100% Cotton-10/1-1900 CSP | 0 | | | | 0 | | 100 | | | | | | 100 |
| 100% Cotton-13/1-1800 CSP | 0 | | | | 0 | | 100 | | | | | | 100 |
| 100% Cotton-10/1-1850 CSP | 10 | | | | 10 | | 80 | | | | | | 100 |
| 100% Cotton-13/1-1750 CSP | 10 | | | | 10 | | 80 | | | | | | 100 |
| 100% Cotton-10/1-1850 CSP | 15 | | | | 15 | | 70 | | | | | | 100 |
| 100% Cotton-13/1-1750 CSP | 15 | | | | 15 | | 70 | | | | | | 100 |

The roving waste is selected from Cotton fibers, Natural fibers or natural, Synthetic blend and the like. The method is implemented with a system comprising standard manufacturing equipments such as roving waste opener, blow room, carding machine, draw frame, roving frame, ring frame and winding/auto winding machine. Premium fabrics such as bath towels, bath mats, bed Linen fabrics and the like with with green ECO label using regenerated yarn produced from roving waste material.

Maximum beating point will be 2-3 when compare the virgin process in which it is from 3 to 4. Because the roving waste is already free from trash. It is essential to align the loose fibers in the fiber strands core area, the minimum 1 beating point is required. Yarn is produced without any increase in TM (Twist Multiplier) Compared to virgin material both in simplex (Roving Frame) and Ring spinning Process. The roving waste is itself having a very minimum short fibers when compare to the other waste. So there is no necessary to increase TM when compare to the virgin while processing in both Roving & ring frame.

The present invention relates to the formation of yarn from roving waste, and the yarn so obtained is produced at the same TM, with comparable level of feel and aesthetics as that of the virgin yarn. The yarn doesn't need to be consolidated together by means of higher twist and hence doesn't adversely affect the production tonnage. Also the yarn is also comparable in terms of its hairiness and other feel properties. Twist multiplier is a unit which helps to decide their twist per unit length for different counts from the same raw material. This is nothing but the angle of inclination of the helical disposition of the fibre in the yarn.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

I claim:

1. A method for manufacturing regenerated ring spun yarn with roving waste material, comprising:
    collecting the roving waste from a roving frame and a ring frame;
    collecting the comber noil from a comber and the carding flat waste from a carding machine;
    opening the roving waste by using roving waste opener;
        characterized in that, mixing 60-100% by weight of roving waste with 0-20% by weight of comber noil and 0-20% by weight of carding waste material through the blow-room with 2-3 beating points with a flat speed in carding at 280 to 310 MPM;
    doubling and processing carded sliver with 60-100% by weight of roving waste, 0-20% by weight of comber noil and 0-20% by weight of carding waste material through the drawing frame;
    feeding the drafted sliver to the roving frame by keeping the Twist Multiplier at 1.4 to 1.54;
    feeding the roving bobbin in to the ring frame to produce the yarn and wound it on the winding/auto winding machine; and
    regenerating yarn of 100% cotton/regenerated ring spun yarn made out of 60-100% by weight of roving waste with 0-20% by weight of comber noil and 0-20% by weight of carding waste material,
        wherein the 100% yarn is produced without any increase in twist multiplier compared to virgin material both in simplex roving frame and ring spinning process, since roving waste comprises of minimum short fibers, and
        wherein the regenerated ring spun yarn comprises of 100% by weight of roving waste or a combination of roving waste with comber noil and carding flat waste.

2. The method for manufacturing regenerated ring spun yarn with roving waste material as claimed in claim 1, wherein the sliver is spun into yarn of 100% cotton with sheath core effect or with a core made of manmade fiber and the sheath made of 100% Regenerated cotton roving fiber.

3. The method for manufacturing regenerated ring spun yarn with roving waste material as claimed in claim 1, wherein the roving cotton waste materials are taken as source material in a process for making regenerated ring spun yarn.

4. The method for manufacturing regenerated ring spun yarn with roving waste material as claimed in claim 1, wherein the roving waste is selected from Cotton fibers, Natural fibers or natural, Synthetic blend and the like.

5. The method for manufacturing regenerated ring spun yarn with roving waste material as claimed in claim 1, wherein the method is implemented with a system comprising standard manufacturing equipments such as roving waste opener, blow room, carding machine, draw frame, roving frame, ring frame and winding/auto winding machine.

6. The method for manufacturing regenerated ring spun yarn with roving waste material as claimed in claim 1, wherein premium fabrics such as bath towels, bath mats, bed Linen fabrics and the like with green ECO label using regenerated yarn produced from roving waste material.

* * * * *